US011681035B2

(12) United States Patent
Billaud et al.

(10) Patent No.: US 11,681,035 B2
(45) Date of Patent: Jun. 20, 2023

(54) META SECONDARY RADAR

(71) Applicant: THALES, Courbevoie (FR)

(72) Inventors: Philippe Billaud, Limours (FR); Sylvain Colin, Ymare (FR); Philippe Joly, Limours (FR)

(73) Assignee: THALES, Courbevoie (FR)

( * ) Notice: Subject to any disclaimer, the term of this patent is extended or adjusted under 35 U.S.C. 154(b) by 263 days.

(21) Appl. No.: 17/222,766

(22) Filed: Apr. 5, 2021

(65) Prior Publication Data

US 2021/0325527 A1  Oct. 21, 2021

(30) Foreign Application Priority Data

Apr. 16, 2020  (FR) ..................................... 2003806

(51) Int. Cl.
*G01S 13/78* (2006.01)
*H01Q 1/24* (2006.01)

(52) U.S. Cl.
CPC ........... *G01S 13/782* (2013.01); *H01Q 1/247* (2013.01)

(58) Field of Classification Search
CPC ...... G01S 13/762; G01S 13/782; G01S 13/91; G01S 7/034; G01S 7/038; G01S 7/2813; H01Q 1/247
See application file for complete search history.

(56) References Cited

U.S. PATENT DOCUMENTS

| 2019/0187271 | A1* | 6/2019 | Billaud | .................. G01S 13/91 |
| 2021/0156989 | A1* | 5/2021 | Billaud | .................. G01S 7/021 |
| 2021/0270955 | A1* | 9/2021 | Billaud | .................. G01S 13/91 |

FOREIGN PATENT DOCUMENTS

| EP | 3 273 262 A1 | 1/2018 |
| FR | 2 658 967 A1 | 8/1991 |
| FR | 3 019 905 A1 | 10/2015 |

OTHER PUBLICATIONS

Mariano, et al., "Multi-functional compact radar for surveillance in terminal areas (RAMS): New solution for radar surveillance in terminal approach area", 2014 Tyrrhenian International Workshop on Digital Communications—Enhanced Surveillance of Aircraft and Vehicles (TIWDC/ESAV), pp. 56-61, Sep. 15, 2014.

* cited by examiner

*Primary Examiner* — Timothy A Brainard
(74) *Attorney, Agent, or Firm* — BakerHostetler

(57) ABSTRACT

The radar includes an antenna having a radiation pattern forming a sum channel, SUM, a radiation pattern forming a difference channel, DIFF, and a pattern forming a control channel, CONT, a first transmission and reception chain being associated with the SUM channel and a second transmission and reception chain being associated with the CONT channel, a reception channel being associated with the DIFF channel. Each of the transmission and reception chains is able to transmit and to receive simultaneously, the transmission chain comprising a filtering operation that filters signals transmitted at 1090 MHz and the reception chain comprising a filtering operation that filter signals transmitted at 1030 MHz, in such a way that the chains operate independently of one another.

11 Claims, 15 Drawing Sheets

META SECONDARY RADAR

CROSS-REFERENCE TO RELATED APPLICATIONS

This application claims priority to foreign French patent application No. FR 2003806, filed on Apr. 16, 2020, the disclosure of which is incorporated by reference in its entirety.

FIELD OF THE INVENTION

The present invention relates to the field of air traffic control (ATC).

BACKGROUND

Currently, aerial control is mainly based on secondary radar the detection reliability of which is widely recognized, secondary radar ensuring synchronous-mode surveillance of aircraft according to SSR and Mode S protocols. Moreover, asynchronous reception of extended ADS-B (Automatic Dependent Surveillance-Broadcast) squitters, which are provided for to ensure collision avoidance (TCAS: Traffic alert and Collision Avoidance System) on-board aircraft, is exploited in on-the-ground ATC thus delivering one portion of the interactive surveillance system.

This surveillance may be coupled with a surveillance of IFF (Identification Friend or Foe) type, IFF interrogators ensuring the identification of aircraft according to various military protocols.

Within a single structure grouping these sensors together, the operational use of these various activities requires simultaneously:

the secondary radar and the IFF interrogator, if the latter is used, to be listened for simultaneously, these modes suffering from a limitation of the dwell time on the target in order to ensure, separately in time:

ATC surveillance both for SSR targets but also in Mode S with two to three BDS (commB Data Selector) registers per aeroplane to be extracted in turn, as conventionally required by the user;

optionally IFF identification with protocols the main military protection of which consists in subjecting the response to a long variable delay, in addition to the duration related to the range, and that therefore requires, by nature, a long target radiation time;

either civil ADS-B squitters or military Mode 5 squitters to be listened for in asynchronous mode, this listening operation:

being particularly polluted by the interrogation transmissions of the synchronous modes, which transmissions are numerous in particular in Mode S (at least 2 and 3 interrogations per aeroplane);

being associated with a low detection and decoding probability in the presence of many targets because of the lack of azimuthal selectivity, because the asynchronous-mode listening operation is by nature omnidirectional.

By way of example, considering 1200 aeroplanes per antenna rotation with an extraction of two BDS per target and a re-interrogation rate of about 1.5 (related to various external factors such as garbled responses, the occupancy of the transponder, the movement of the target, etc.), i.e. 3600 interrogations of ~20 µs (duration taken from the ICAO Annex 10 Vol IV), the duration of garbling due solely to synchronous interrogations is about 140 µs for extended Mode S responses, i.e. 504 milliseconds are polluted per 4 second rotation of the antenna, this corresponding to about 13% of the duration of the listening operation. Specifically, because of its synchronous-mode operation a secondary radar requires no isolation between its transmission chain and its reception chain since they operate at different times; as a result thereof conventionally the leakages of the transmission have a level in the reception chain close to the highest magnitude responses normally expected from an aeroplane thus making any simultaneous listening operations impossible for the duration of the interrogation. Thus, in existing radars, perturbations due to synchronous transmissions necessarily limit to less than 87% the probability of detection of ADS-B squitters (this maximum not taking into account all the other possible environment-related reasons for non-detection, such as response and ADS-B squitter garbling, multipath, etc.).

In addition, an ATC secondary radar antenna is designed to operate in synchronous mode with targets in the plane of the normal to the main panel of the aerial; as a result thereof its 360-degree electromagnetic coverage, which is required to listen in asynchronous mode, has limitations that we will describe in detail below.

To avoid these difficulties, the prior art, which is for example disclosed in documents FR 3 019 905 A1 and FR 2 658 967 A1, keeps these various activities separate in order to ensure the highest possible performance, the architecture being matched to the specificities of each activity. Thus, conventional ADS-B reception often consists of two back-to-back 180° antennas associated with two independent receivers in order to ensure a better detection than with a single 360° omnidirectional antenna, which antennas are distinct from the radar antenna when they are on the same site. In addition, IFF identification is most of the time carried out to the detriment of the Mode S surveillance in the antenna rotation and in the sector concerned by the IFF identification because of a lack of dwell time to perform the 2 simultaneously at the azimuth required for the IFF identification.

Consequently, implementing all these surveillance and identification activities generates high operating and maintenance costs. In particular, it is necessary to take into account purchasing costs, infrastructure costs, costs of ownership and networking costs.

SUMMARY OF THE INVENTION

One aim of the invention is especially to obtain a low-cost, integrated interrogation and surveillance system delivering a performance almost comparable to independent systems. To this end, the subject of the invention is a secondary radar comprising an antenna having a radiation pattern forming a sum channel, designated SUM, a radiation pattern forming a difference channel, designated DIFF, and a pattern forming a control channel, designated CONT, a first transmission and reception chain being associated with the SUM channel and a second transmission and reception chain being associated with the CONT channel, a reception chain being associated with the DIFF channel, in which radar:

each of said transmission and reception chains is able to transmit and to receive simultaneously, the transmission chain comprising a filtering operation that filters signals transmitted at 1090 MHz and the reception chain comprising a filtering operation that filters signals transmitted at 1030 MHz, and said reception chain associated with the DIFF channel comprising a filtering operation that filter signals transmitted at 1030 MHz, in such a way that said chains operate independently of one another, the reception-side signal level remaining unchanged during a synchronous interrogation transmission;

the processing means comprise matching reception-side frequency bands to the characteristics of each of the transaction protocols used;

said reception chains of the SUM, DIFF and CONT channels, respectively, are able to simultaneously listen in synchronous and asynchronous mode for signals received from targets via the SUM, DIFF and CONT patterns, respectively, said operations of listening in synchronous and asynchronous mode being independent of each other, the reception-side signal level remaining unchanged during a synchronous interrogation transmission.

In one particular embodiment, said CONT pattern being composed of a front radiation pattern forming a channel designated CONT_Front and a back radiation pattern forming a channel designated CONT_Back, said CONT_Front and CONT_Back patterns are processed separately in such a way that each of said transmission and reception chains is applied to the CONT_Front channel and to the CONT_Back channel.

Said radar for example comprises a kit for extending the radiation pattern of the CONT_Back channel, which is placed on the back side of said antenna, said kit comprising three radiating patches:

a first patch for filling the elevationwise detection hole called the cone of silence;

a second patch for filling the detection hole at the azimuth 90°;

a second patch for filling the detection hole at the azimuth −90°.

Each of said transmission chains for example comprises filtering operations dedicated to rejecting parasitic signals transmitted at 1090 MHz.

Each of said reception chains for example comprises filtering operations dedicated to rejecting parasitic signals at 1030 MHz originating from the transmission channel.

In a case where it has as mission ATC surveillance, said radar for example performs simultaneous listening operations via said patterns separately for ADS-B squitters and independently of synchronous transactions.

In a case where it has as mission IFF identification, said radar for example performs synchronous IFF detections, independently of synchronous SSR and Mode S transactions.

In a case where it has as mission IFF identification, said radar for example performs simultaneous listening operations via said patterns separately for Mode 5 Level 2 squitters, independently of synchronous transactions.

In a case where it has as mission control of the aerial environment, said radar for example performs simultaneous listening operations via said patterns separately for any type of secondary responses, independently of synchronous transactions.

Said radar successively transmitting in all-call interrogation periods and roll-call interrogation periods, the roll-call interrogations for example start in the all-call interrogation periods.

Said radar successively transmitting in all-call interrogation periods and roll-call interrogation periods, all-call listening operations started in all-call periods for example continue into roll-call periods.

BRIEF DESCRIPTION OF THE DRAWINGS

Other features and advantages of the invention will become apparent with the aid of the description which follows, made in relation to the appended drawings which show.

DETAILED DESCRIPTION

To decrease the various costs mentioned in the introduction, the present invention proposes a given system, which will be called the full-duplex meta secondary sensor, that groups together all the activities of on-the-ground sensors:

conventional secondary radar: ensuring synchronous-mode surveillance of aircraft according to the SSR and Mode S protocols;

IFF interrogator ensuring the identification of aircraft according to Mode 4 and Mode 5 protocols;

asynchronous receiver of extended ADS-B squitter (DF17/18);

asynchronous receiver of Mode 5 Level 2 squitter;

while furthermore exploiting the same aerial structure (rotation, antenna, motors, rotary joint, cables, etc.) and the same infrastructure.

The approach of the solution provided by the invention is therefore, in a context of resources common to these various activities within the meta secondary sensor, to exploit the specificities of these activities in order to orthogonalize them. By orthogonalize what is meant is to make them independent of one another and thus to obtain for each thereof the same performance whether they be alone in operating or all activated simultaneously.

Figure 1A:
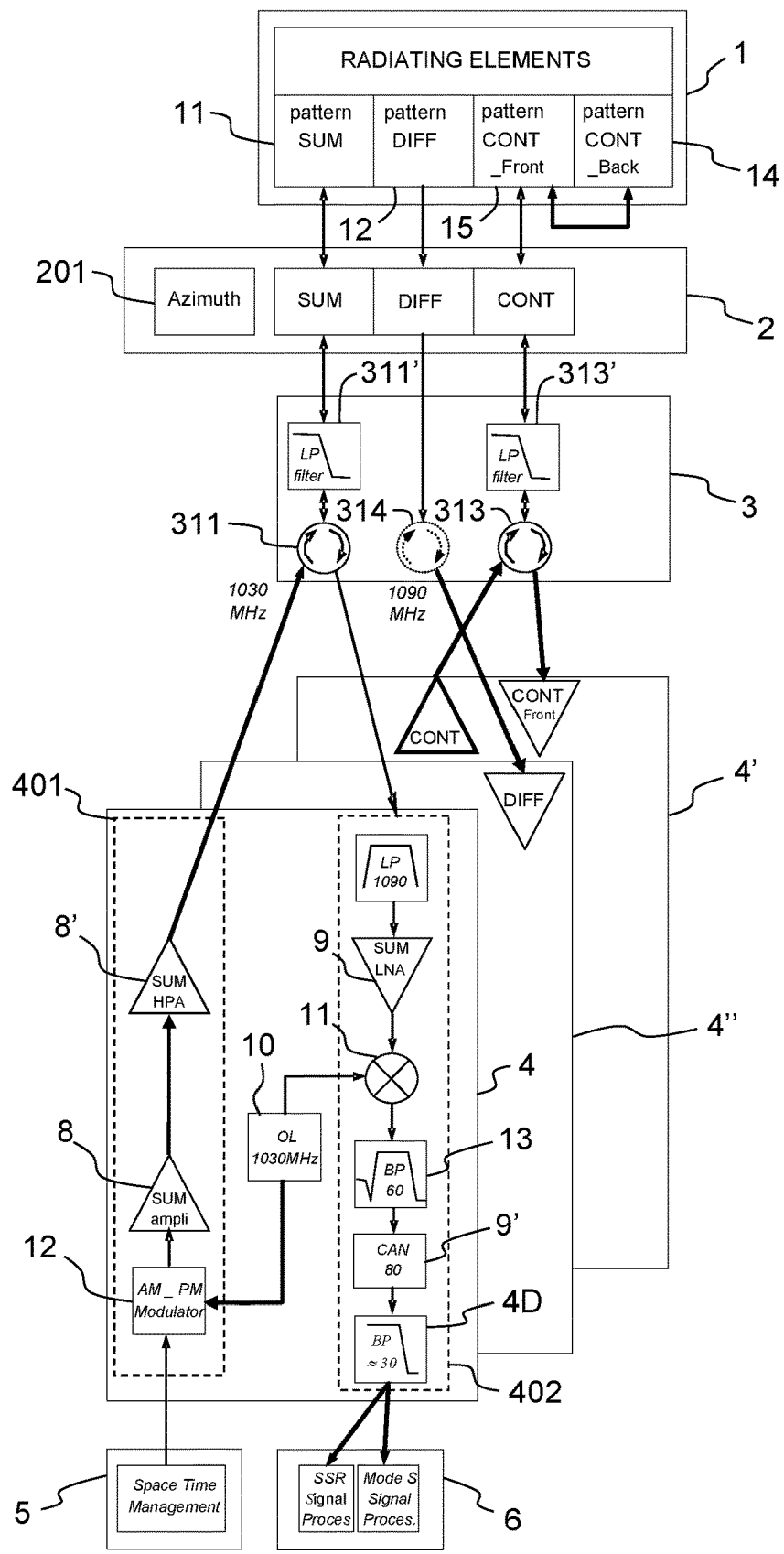
FIG. 1a, a diagram of an exemplary embodiment of a conventional secondary radar.
Figure 1B:
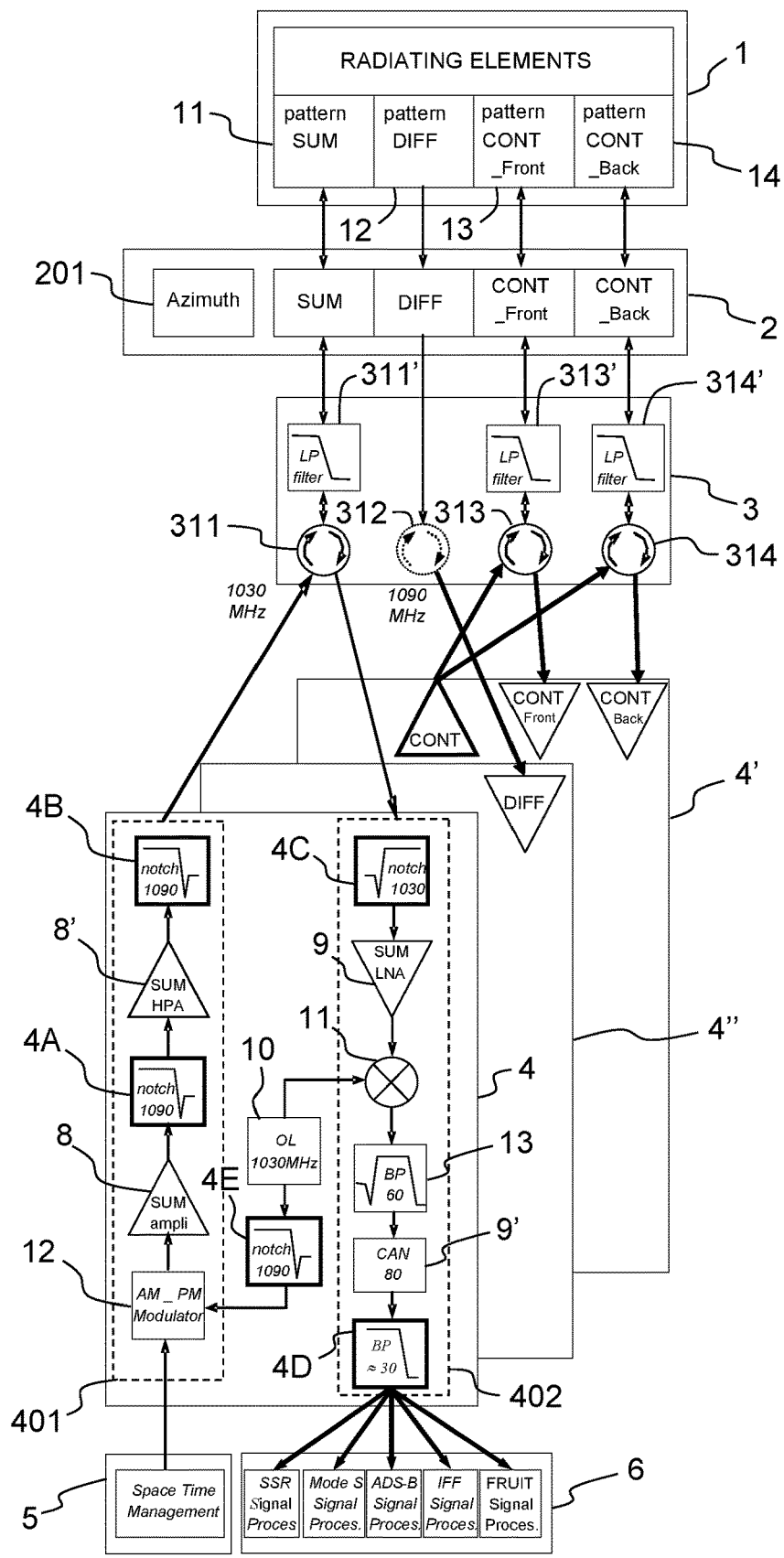
FIG. 1b, a diagram of an exemplary embodiment of a radar according to the invention.

The meta sensor thus:

simultaneously transmits and receives the various signals, ensuring a complete independence of transmission tasks and reception tasks by exploiting the two-frequency aspect that is characteristic of secondary radar (transmission at 1030 MHz and reception at 1090 MHz): the term "full-duplex"

will be used below to refer to such an operating mode in which transmission and reception are simultaneous;

carries out a filtering operation matched to the characteristics of each employed protocol, i.e. a filtering operation allowing only the frequency band containing the useful signal to be processed as illustrated in FIG. 1b, which is described below;

listens in synchronous mode, for the purpose of simultaneously performing ATC surveillance (in SSR and in Mode S) and IFF identification (in military encrypted modes);

listens in asynchronous mode via the various physically available (i.e. depending on the architecture of the aerial) antenna patterns, but also improves the radiating characteristics of the radar with respect to the asynchronous-mode listening operation solely in order to ensure a better coverage at high elevation and a temporal listening operation of almost 100% in azimuth.

The "full-duplex" operation according to the invention therefore allows:

asynchronous-mode listening operations to be performed (ADS-B or Mode 5 Level 2 squitters) without suffering from perturbations due to the synchronous emissions;

within the Mode S protocol, the duration of the sequences of roll-call transactions (in so-called roll-call periods (RC)) to be optimized and thus the lower limit of the dwell time on targets to be decreased, this being particularly important, though not solely, in the case of radar of high rotation speeds (typically 4 seconds per antenna rotation is conventional in an airport configuration for example (see FIG. 6));

independently of the optimization of the RC, targets to be detected as they enter into the electromagnetic range of the radar without disrupting the operational performance of the radar, i.e. without modification of the duration of the all-call periods dedicated to this end (see FIG. 7), this then allowing these entering targets to be locked out earlier to remove the DF11 responses that they generate following the UF11 interrogations of this radar otherwise their response potential is needlessly consumed;

otherwise pollution is created, i.e. these responses constitute pollution to the other radars, in particular those closest the target.

The filtering operation matched to each protocol employed allows, in the receiver, an analysis band to be obtained that is as wide as needs be, and that is completed by these filtering operations matched to the useful signal band of each protocol (i.e. to both the spectrum of its modulation but also to the frequency stability of the carrier of the transponder) this allowing noise level to be decreased, and thus permitting the detection threshold to be decreased with a view to processing weaker signals and therefore furthermore improving range.

Figure 4A:
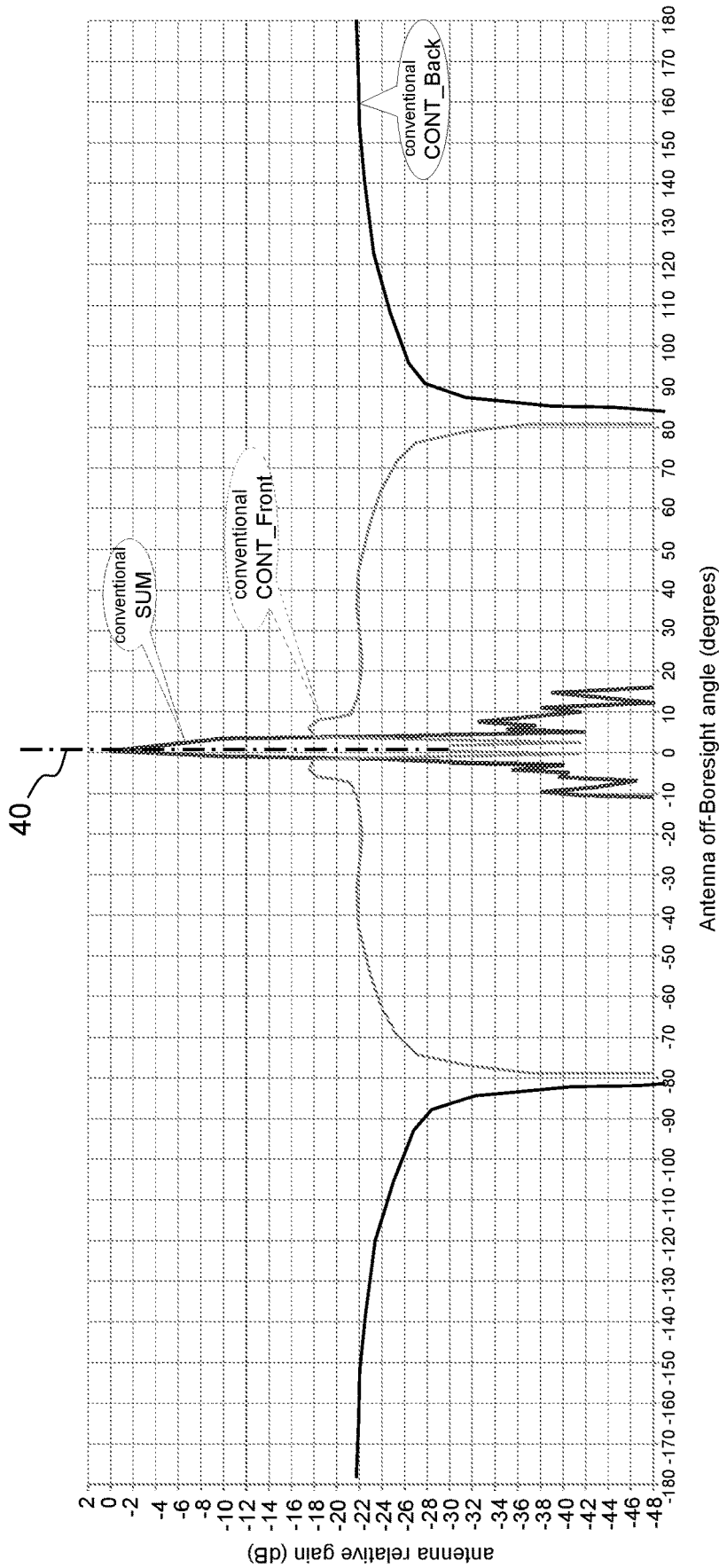
FIG. 4a, a presentation of the gains of 3 patterns SUM, CONT_Front and CONT_Back of the antenna as a function of azimuth between +/−180°.
Figure 4B:
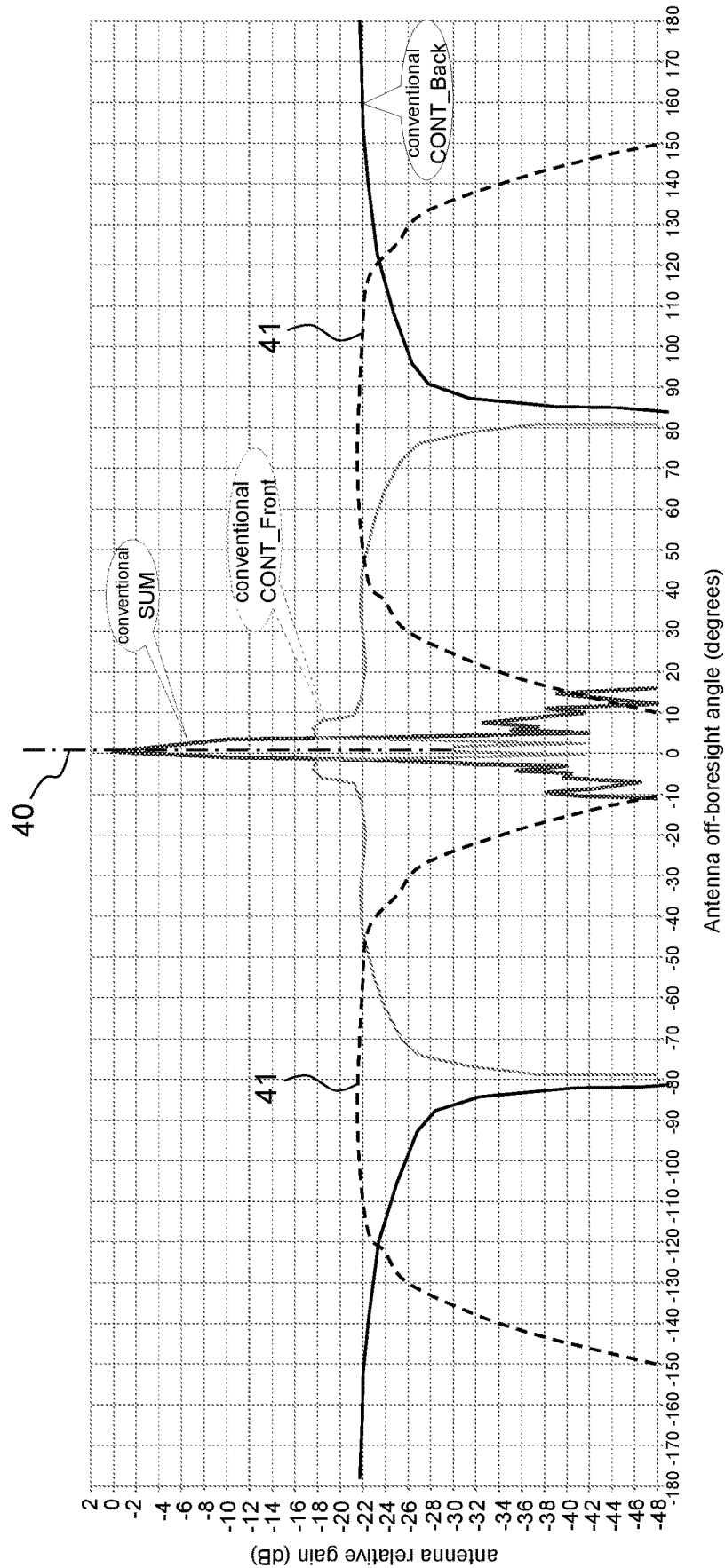
FIG. 4b, a presentation of the contribution of the extension of the pattern CONT_Back in azimuth according to the invention.
Figure 4C:
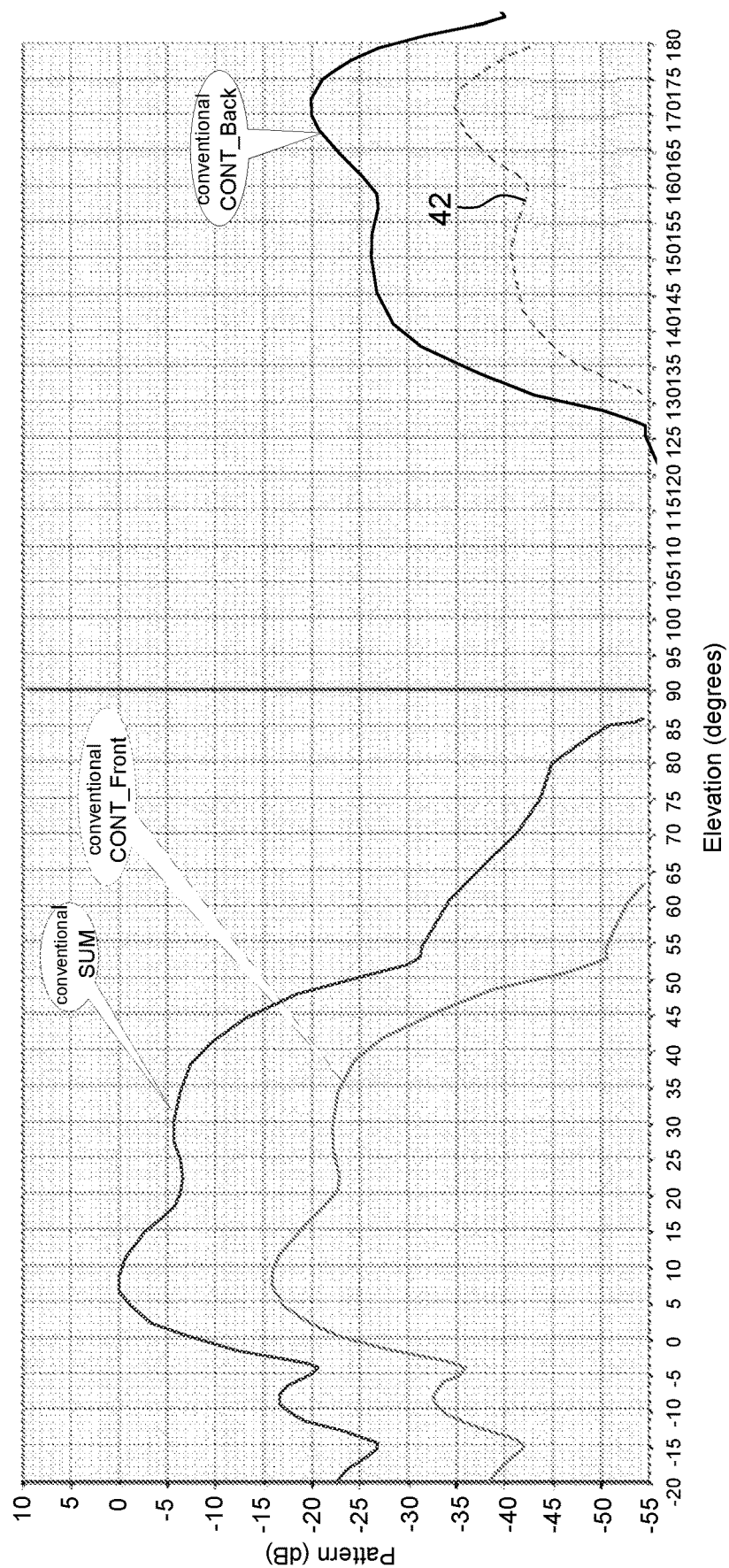
FIG. 4c, a presentation of the gains of 3 patterns SUM, CONT_Front and CONT_Back of the antenna as a function of elevation from −60° to +180°.
Figure 4D:
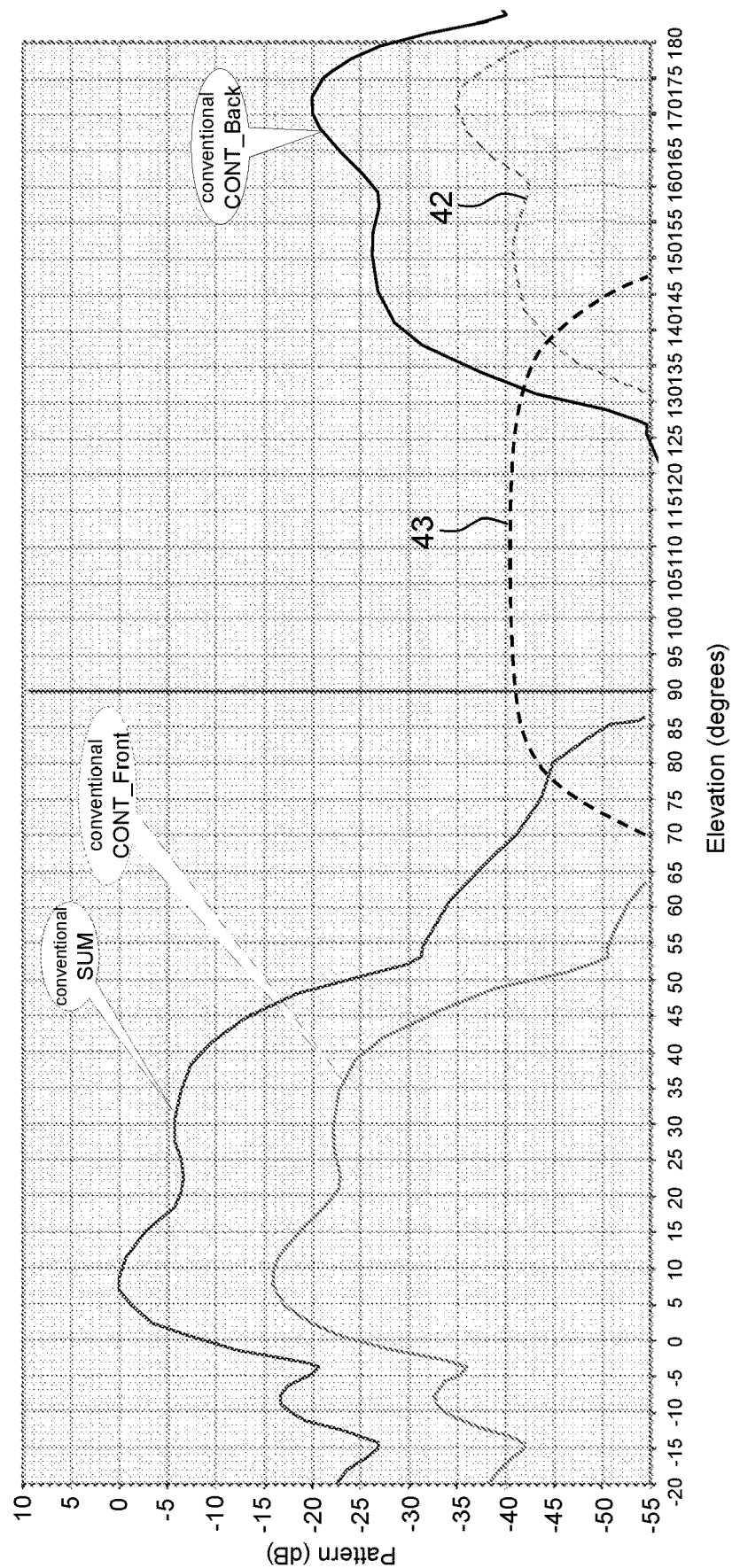
FIG. 4d, a presentation of the contribution of the extension of the pattern CONT_Back in elevation according to the invention.

The independent asynchronous-mode operation of listening simultaneously via the three or four patterns of a conventional ACT antenna therefore allows:

by processing reception-side independently the patterns SUM, DIFF, CONT_Front and CONT_Back, a temporal coverage to be ensured for the synchronous-mode listening operation of about 75% at medium distance (see FIG. 4a), simultaneous squitters to be better detected by exploiting their difference in off-boresight angle if there is one, so to decrease the degree of overlap of the responses (which are quite long (120 µs)), which is a cause of non-detection of squitters, in addition, by completing the radiation pattern of the ATC secondary antenna of the radar, with respect to its asynchronous-mode detection function:

coverage in the cone of silence (Cos) to be ensured (see FIG. 4d);

a temporal coverage of 100% over the maximum distance both in ADS-B and in IFF to be ensured (see FIG. 4b).

The features and advantages of the invention presented above will be described below with reference to the figures.

FIG. 1a it will be recalled shows a diagram of a conventional ATC surveillance radar from which only synchronous-mode operation in Mode S and SSR is expected. The transmission and reception chains 401, 402 possess an isolation level just sufficient to guarantee non-destruction in case of an infinite SWR at the output of the processing cabinet. The patterns CONT_Front and CONT_Back of the ATC secondary antenna are merged by the aerial 1, 2 (pattern CONT) since any signals not exactly on the axis of the antenna, i.e. the axis of SUM, are simply rejected whether they come from in front or behind.

FIG. 1b shows a diagram of a device according to the invention. Via the proposed architecture, the properties of the "full-duplex" meta secondary sensor that were presented above are obtained. In particular, this architecture ensures the simultaneous operation of the various secondary protocols with almost no influence therebetween. Thus, for each protocol, it is guaranteed that, when operating simultaneously with the other protocols, the same performance is achieved thereby as achievable in the antenna structure of the sensor with the other protocols inactive. The architecture of FIG. 1b is the evolution of the conventional architecture of a secondary radar that is shown in FIG. 1a. Some of the following description describes the components already present in the conventional radar of FIG. 1a, the additional elements being highlighted via the use of thicker lines.

In its conventional operating configuration, the secondary radar operates in synchronous mode, i.e. it emits an interrogation and waits for a response consistent therewith, thereby allowing it to locate through measurement (in terms of azimuth and distance) and to identify (typically via an address in the Mode S protocol) the target.

In order to perform this task effectively, the radar is equipped with an antenna 1 having a plurality of patterns 11, 12, 13, 14, whose roles are conventionally:

sum pattern 11, hereinafter denoted SUM, to interrogate and detect the synchronous response of the target;

difference pattern 12, denoted DIFF, to accurately locate the target in the SUM beam;

control pattern, denoted CONT (see FIG. 1a), which may advantageously be split into two patterns in the context of one option of the invention (this option may therefore employ separate processing of the 3 or 4 patterns of the antenna):

first control pattern 13, denoted CONT_Front, to block and reject the responses coming from targets facing the antenna and not present in the main SUM beam;

second control pattern 14, denoted CONT_Back, to block and reject the responses coming from targets at the back of the antenna (therefore necessarily not present in the main SUM beam).

In the rest of the invention this configuration using the patterns CONT_Front and CONT_Back is considered, these two patterns possibly being processed separately. Reference to the channel CONT will possibly include the channels CONT_Front and CONT_Back with regard to the example of FIG. 1b.

A rotary joint 2 and antenna down cables, for a rotating antenna, ensure:

RF coupling of the signals transmitted at 1030 MHz and received at 1090 MHz independently for the four patterns (SUM, DIFF, CONT_Front and CONT_Back) between the rotating part and the fixed part of the radar;

the distribution of the azimuthal position 201 of the axis of the main lobe of the antenna.

A duplexer 3 ensures the RF coupling between the signals transmitted at 1030 MHz and received at 1090 MHz, independently for the four patterns. To this end, the duplexer 3 comprises a circulator associated with each channel. In the example of FIG. 1b, three circulators 311, 313, 314 decouple the transmission at 1030 MHz and the reception at 1090 MHz of the SUM, CONT_Front and CONT_Back channels, respectively. In purely synchronous operation, the listening operation is performed solely via the main lobe of the radar, i.e. via the SUM and DIFF channels, after the phase of transmission over the SUM and DIFF channels. As the DIFF channel operates solely in reception, the circulator 312 operates only one way, solely routing reception signals obtained via the antenna (the circulator is optional, its use on DIFF has no other aim than balancing the signals between SUM and DIFF with a view to measuring angle error). In synchronous mode, the operation of listening via the CONT channel has no other aim than rejecting the responses received with more energy in the CONT pattern then in the SUM pattern.

Filters 311', 313', 314' are placed upstream of the circulators on the SUM, CONT_Front and CONT_Back channels. These filters are mainly used downstream in transmission to filter the harmonics of the transmitted signals. The same filters also serve in reception to protect from frequencies outside of the useful band of the secondary radar (i.e. about 1020 to 1100 MHz).

The SUM and CONT channels are therefore used both for transmission and reception. For reasons of readability, only the transmission and reception circuits 4 of the SUM channel have been shown in FIG. 1b (and in FIG. 1a) (the circuits being the same for the CONT channel, or the CONT_Front and CONT_Back channels):

the architecture of the transmission and reception circuits 4' of the CONT channel (FIG. 1a) and CONT_Front/CONT_Back channel (FIG. 1b) being analogous to those of SUM, respectively.

the circuits 4" of the DIFF channel are not illustrated and are identical to those of the reception of SUM.

Space-time management 5 ensures real-time management of the interrogation periods and associated listening periods of the various secondary protocols: IFF, SSR and Mode S protocols. Specific per-protocol signal processing 6 exploits the signals obtained via the various patterns SUM, DIFF, CONT_Front and CONT_Back separately.

Again with reference to FIG. 1b, the transmission and reception portion 4 that is associated with the SUM channel and located between the circulator 311 of the duplicator and the space-time management 5 and the signal processing 6 will now be described. This transmission/reception portion 4 comprises adaptations specific to the invention. In particular, the SUM transmission chain 401, which transmits at 1030 MHz, incorporates additional filtering operations 4A, 4B that are dedicated to decreasing transmission noise, and more particularly to rejecting parasitic signals at 1090 MHz, in order to keep the level of the residual noise, after coupling 311, at the level of the noise of the receiver. The transmission chain comprises a first amplifier 8 that performs a first amplification; it is followed by a first filter 4A. The latter is followed by a second amplifier 8', which is a power amplifier, and which delivers the transmission signal, this amplifier being followed by the second filter 4B.

The SUM reception chain 402, which operates at 1090 MHz, conventionally comprises a low-noise amplifier 9 and an analogue-digital converter (ADC) 9'. It also comprises adaptations specific to the invention, just like the transmission chain, and in particular additional filtering operations 4C, 4D dedicated to rejecting parasitic signals, at 1030 MHz, originating from the transmission channel, in order to keep the coupling level at the circulator (or due to the SWR of the aerial) and baseband aliasing at the level of the noise of the receiver. In particular, the reception channel comprises an input filter 4C, upstream of the low-noise amplifier 9. This filter, which is a bandpass filter, is intended to:

select reception signals in the frequency band about 1090 MHz;

very strongly reject the frequency band about 1030 MHz originating from the transmission chain.

The setup of FIG. 1b is one particular exemplary embodiment comprising a local oscillator (LO) 10 (oscillating at 1030 MHz) that is shared between the transmission channel 401 and the reception channel 402.

In the transmission channel, upstream of the first amplifier 8, the transmission signal is modulated by a modulator 12 at the frequency of the local oscillator 10, i.e. at 1030 MHz. A filter 4E is inserted between the oscillator and the modulator, and intended to filter noise at 1090 MHz. In the reception channel, before analogue-digital conversion 9', the received signal is mixed with the signal of the local oscillator by a mixer 11, then filtered by a bandpass filter 13. A filter 4D is placed at the output of the ADC 9' in order to filter the signal at 1030 MHz.

The DIFF channel, which operates solely in reception, comprises a reception chain analogous to the reception chain 402 of the SUM channel; in particular, it comprises the filtering operation 4C, 4D that filters signals transmitted at 1030 MHz. All of the SUM, DIFF and CONT transmission and/or reception chains operate independently of one another.

The four patterns of the civil ATC antenna are processed separately, requiring one 4-channel receiver (or 3-channel receiver if CONT_Front and CONT_Back are merged into a single CONT as is usually the case and as illustrated in FIG. 1a).

Before any decoding of the responses, each signal-processing operation 6 independently matches its analysis band to the characteristics of the protocol the responses of which it detects. This filtering operation matched to each protocol used allows a better performance to be obtained by decreasing noise level, therefore allowing the detection threshold to be decreased independently for each protocol in order to process weaker signals.

Figure 2A:
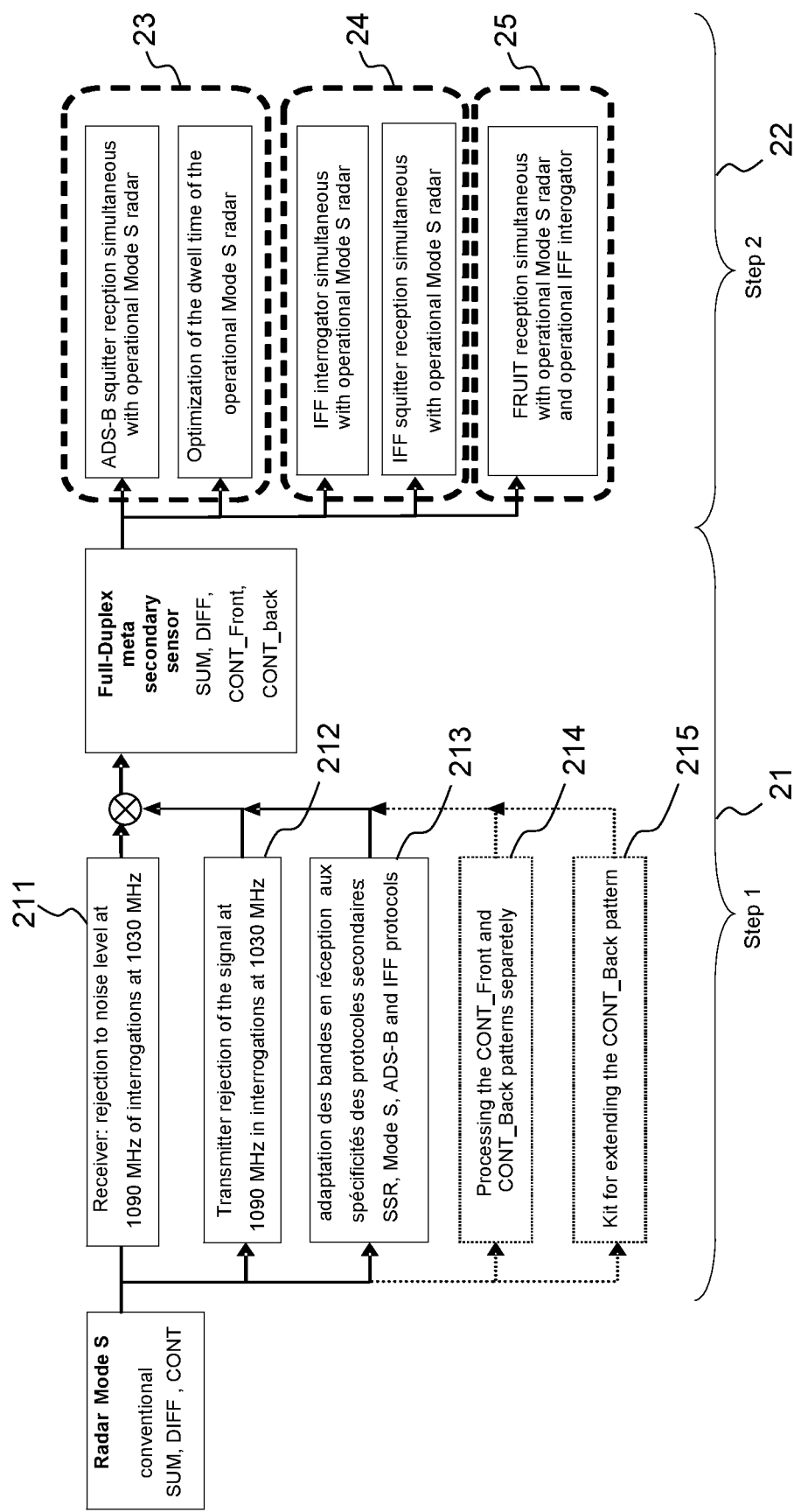
FIG. 2a, possible steps of implementation of the invention.

FIG. 2a illustrates steps of implementation of the invention. At least two steps are necessary for this implementation.

The first step 21 allows a conventional Mode S secondary radar to convert to a "full-duplex" meta secondary sensor according to the invention. In this step 21, the various protocols are orthogonalized and the radar is made suitable for asynchronous reception. The orthogonolization here consists in making the processing operations of the protocols completely independent. In practice, the orthogonolization of the protocols is achieved:

in 211 in the 1090 MHz reception chain, via the rejection of interrogations at 1030 MHz to the noise level of the 1090 MHz chain, as illustrated by the filters 4C, 4D of FIG. 1b;

in 212 in the 1030 MHz transmission chain, via the rejection of the signal transmitted at 1090 MHz below the noise of the 1090 MHz reception, as illustrated by the filters 4A, 4B of FIG. 1b;

reception-side, by matching 213 the analysis bands (BeamWidth_BW) to the characteristics of the employed protocols, in such a way in particular that:

BW_IFF>BW_SSR>BW_MS>BW_ADS-B, where BW_IFF, BW_SSR, BW_MS and BW_ADS-B are the IFF, SSR, Mode S and ADS-B bandwidths, respectively.

by listening, in asynchronous mode, simultaneously:

via the highest number of independent patterns that there are in a secondary radar;

optionally 214, the patterns CONT_Front and CONT_Back may be processed separately;

also optionally 215, a kit for extending the CONT_back pattern reception-side solely to ensure the RF coverage at high elevation and that is complete over 360° of azimuth may be employed.

In the second step 22, the orthogonalization of the protocols is exploited operationally:

in the field of civil aerial control 23 or ATC surveillance:

by simultaneously listening in asynchronous mode via the three or four patterns separately for ADS-B squitters, independently of the synchronous activities;

by optimizing the duration of the sequences of roll-call transactions with no other major constraint than non-overlap of the listening periods in order to avoid "response garbling" and non-overlap of the interrogations (by nature achieved because of the singleness of the transmitter), and doing so with roll-call listening periods simultaneous with all-call transmission periods;

in the field of military aerial control 24 or IFF identification:

via the IFF interrogator, which performs its identification transactions with as sole restriction access to the transmission resource shared with the SSR/Mode S surveillance;

by simultaneously listening via the three or four patterns separately for Mode 5 Level 2 squitters, independently of the synchronous activities;

in the field of control of the aerial environment 25:

by simultaneously listening via the three or four pattern separately for any type of secondary response (including False Replies Unsynchonized In Time (FRUITs), independently of the synchronous activities.

Figure 2B:
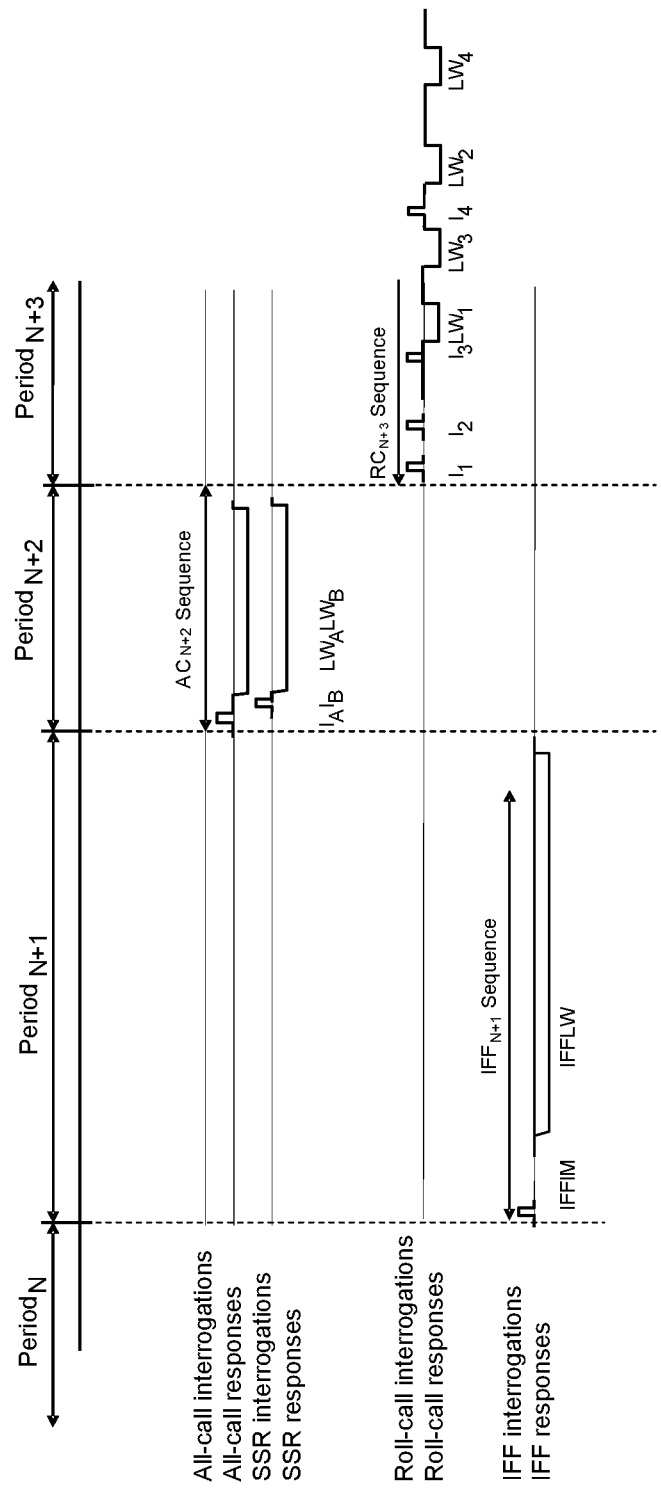
FIG. 2b, an example of sequences of transactions executed by a radar according to the prior art.
Figure 2C:
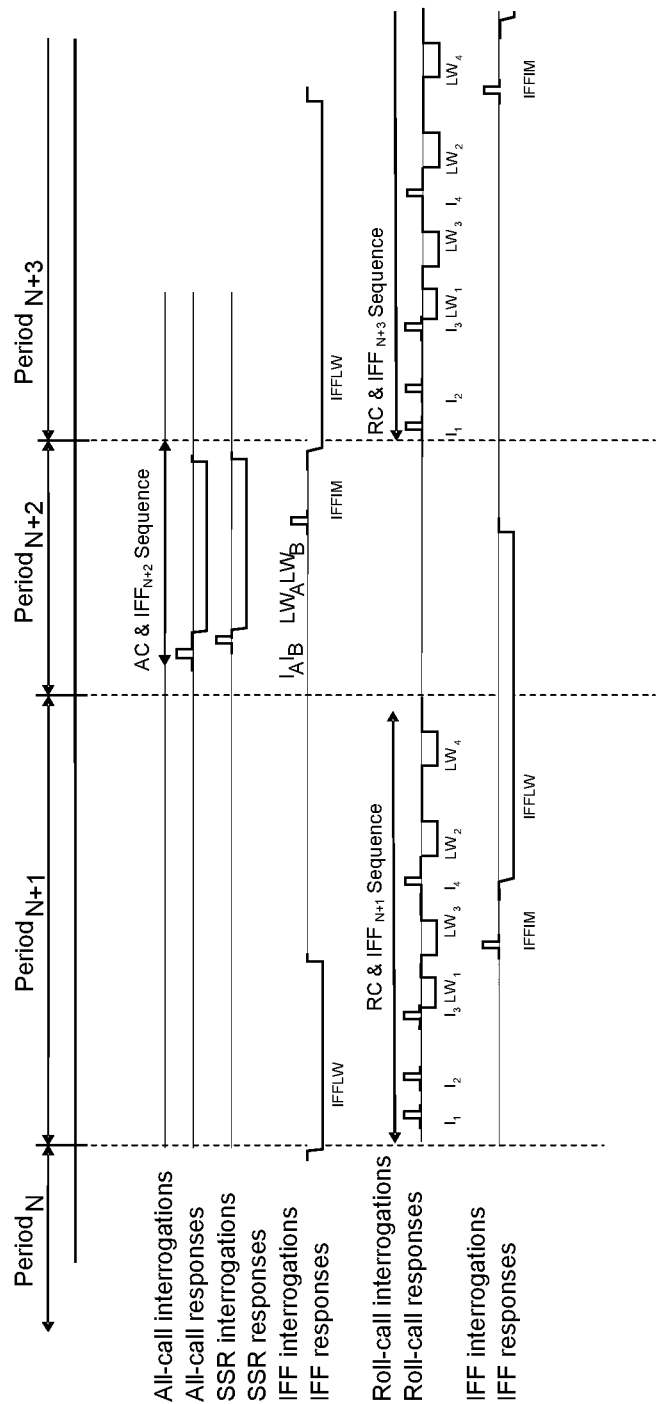
FIG. 2c, an example of sequences of transactions executed by a radar according to the invention.

FIGS. 2b and 2c illustrate the sequencing of the IFF and SSR/Mode S interrogations for a radar according to the prior art and for a radar according to the invention, respectively. FIG. 2b therefore illustrates the conventional operation, according to the prior art, via an example of sequencing of three successive periods:

period N+2: all call (AC), dedicated to all-call SSR and Mode S transactions;

period N+3: roll call (RC), dedicated to roll-call Mode S transactions;

period N+1: IFF, dedicated to the military mode.

If the dwell time on the target allows it, the radar is able at best to interleave the periods according to the above sequencing illustrated in FIG. 2b.

If the dwell time does not allow it, i.e. the speed of rotation of the antenna is high (the commonest case), the radar then performs military IFF identifications to the detriment of the civil surveillance, the three periods not being able to take place in the available dwell time.

FIG. 2c illustrates an example of operation according to the invention. In this case, the transactions may overlap from one period to the next, and, in particular, the IFF identifications may be extended into the periods N+2 and N+3. Specifically, the radar according to the invention executes the IFF transactions at their own specific rate (which differs completely from that of the SSR and Mode S transactions) independently of the AC and RC periods, which are still dedicated to the SSR modes and to the Mode S. This functional orthogonalization (see FIG. 2a) exploits the RF isolation of the transmission and reception (see FIG. 1b), which allows both:

IFF detection despite the many Mode S transmissions (see periods N+1 and N+3 in FIG. 2c);

but also Mode S detection despite the few IFF transmissions (see periods N+1 and N+2 in FIG. 2c).

This enables simultaneous IFF military identifications and civil surveillance, even with radars the rotation speed of which is high.

Figure 3:
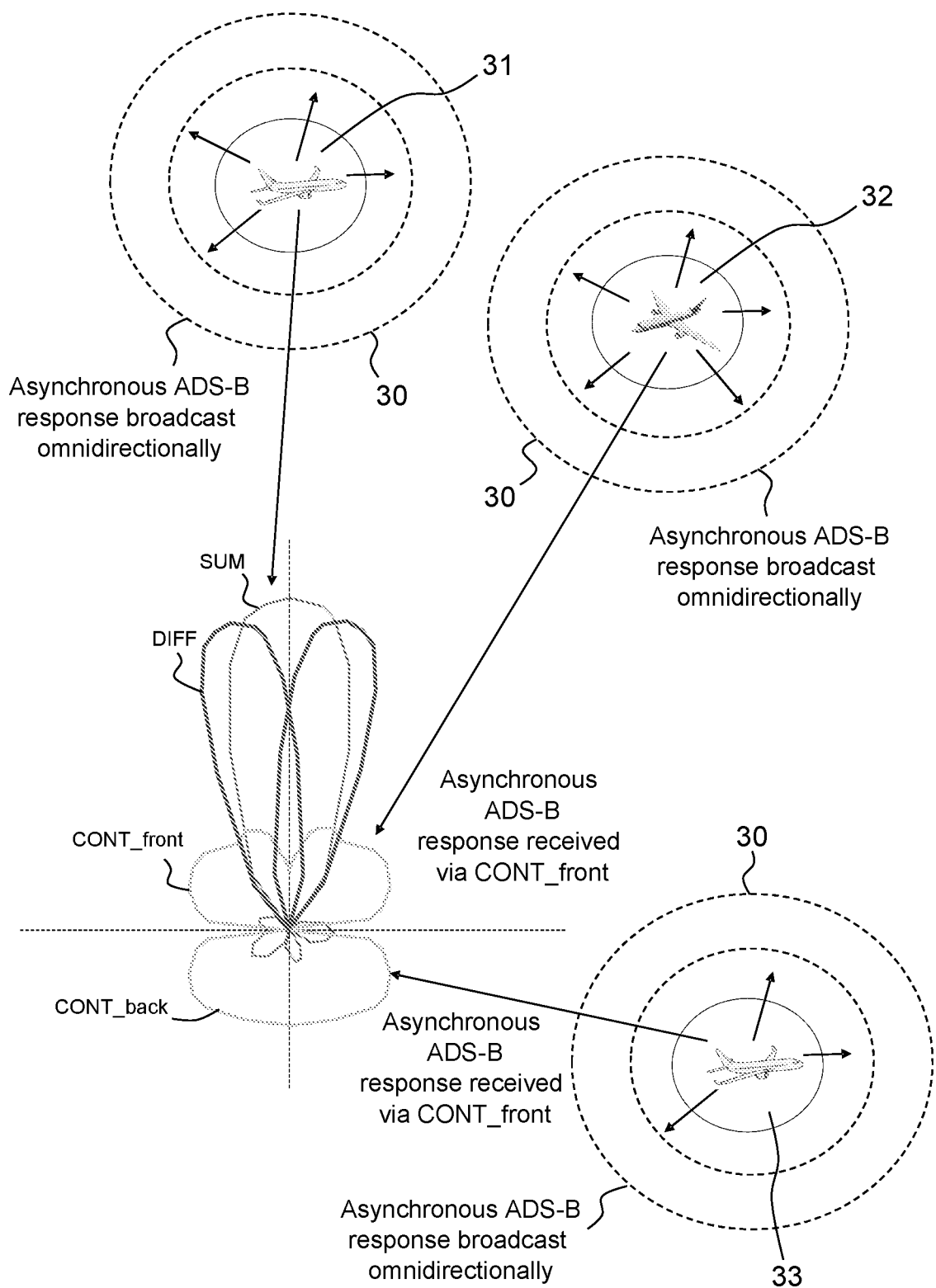
FIG. 3, an illustration of one of the aforementioned steps.

FIG. 3 illustrates one example of operational exploitation, in accordance with step 23 described above, and which optimizes ATC surveillance. This example of exploitation is illustrated with respect to three aircraft 31, 32, 33 present in the environment of a radar according to the invention. ADS_B squitters are listened for simultaneously via the SUM pattern, via the DIFF pattern, via the CONT_Front pattern and via the CONT_Back pattern of the radar. These simultaneous listening operations allow overlap of the asynchronous responses of targets located at different off-boresight angles to be avoided and thus detection and decoding thereof to be improved. The aircraft broadcast the asynchronous ADS-B responses omnidirectionally 30. The response of a first aircraft 31 is thus received via the SUM pattern, the response of a second aircraft 32 is thus received via the CONT_Front pattern and the response of a third aircraft 33 is thus received via the CONT_Back pattern. The independent ADS-B reception per pattern of the antenna thus allows, in this example, these 3 squitters to be detected, even though they are temporally simultaneous.

FIG. 4a shows the gains of the patterns of a conventional ATC secondary antenna of FIG. 1a as a function of azimuth. More precisely, FIG. 4a quantifies, via a plot over 360° (+/−180° with respect to the antenna), the amplitude of the signals received from a given target depending on its azimuth with respect to the axis 40 of the antenna of the radar. In synchronous operation of the radar the preponderant pattern is SUM, which ensures the transmission of the useful interrogations and the reception of the useful responses, whereas the role of the CONT_Front and CONT_Back patterns is to guarantee to be higher sidelobes of the SUM pattern, i.e. to provide a relative gain in order to avoid false radar detections (from targets not on the axis).

In contrast, in the asynchronous-mode reception of ADS-B and IFF squitters, the role of CONT_Front and CONT_Back is preponderant: their absolute gain defines the range of the ADS-B receiver and its 360° coverage is reflected in the temporal coverage of the operation of listening for squitters. At medium ADS-B range, the class of the temporal coverage of the listening operation performed via CONT_Front and CONT_Back is of 75%, this being a consequence of the design of the conventional ATC secondary antenna, as a result of which:

in its main plane, i.e. at +90° and −90° in azimuth, the radiation is zero, this in no way penalizing the synchronous operation of the radar normal to the plane of this antenna, on the axis of the antenna, the gain of CONT_Front is intentionally attenuated in synchronous mode: this intentional drop in gain of CONT_Front being provided in order to ensure a clean differentiation in azimuth between it and the radar beam in synchronous mode.

Thus, listening via SUM (or even via DIFF), in addition to listening via CONT_Front, makes it possible to ensure a temporal coverage of about 5%, by filling the drop in gain of the CONF_Front pattern normal to the plane of the antenna. On the whole, listening in asynchronous mode independently, and therefore simultaneously, via the two or three antenna patterns (SUM, CONT or SUM, CONT_Front, CONT_Back) makes it possible to ensure the asynchronous-mode listening operation has a temporal coverage that is of about 80% at medium ADS-B range, and that remains at least 50% at maximum ADS-B range.

FIG. 4b shows the complementarity of the azimuthal radiation 41 of the pattern CONT_Back according to the invention. The objective is to ensure a 1090 MHz reception-side radiation pattern that has an equivalent level over the entirety of the coverage of CONT; thus, the reception of ADS-B and IFF squitters is ensured, to the maximum ADS-B and IFF range, with a temporal listening coverage of 100%.

FIG. 4c shows the gains of the patterns of a conventional ATC secondary antenna of FIG. 1a as a function of elevation. The pattern of SUM, of CONT_Front and of CONT_Back are shown therein, each for their maximum azimuth:

conventionally, the pattern of SUM has a maximum (see FIG. 4a) of about 15 to 20 dB higher than CONT_Front;

the leakages 42 of the SUM pattern of the front panel, opposite the normal to the plane of the antenna, are conventionally lower than −35 dB.

It may be seen that, by design, an ATC secondary antenna exhibits a very large drop in gain at high elevation, i.e. beyond 50° in elevation. Consequently, secondary radars conventionally do not detect in a cone of silence (CoS) extending from 45° of elevation. The ADS-B function integrated into a radar and using the same antenna exhibits the same type of CoS.

FIG. 4d shows the complementarity of the elevationwise radiation 43 of the pattern CONT_Back according to the invention. The objective is to ensure there is a 1090 MHz reception-side radiation pattern even at very high elevation) (>85°, allowing ADS-B and IFF squitters to be received via this extension of the CONT_Back pattern to high elevations.

Figure 5:
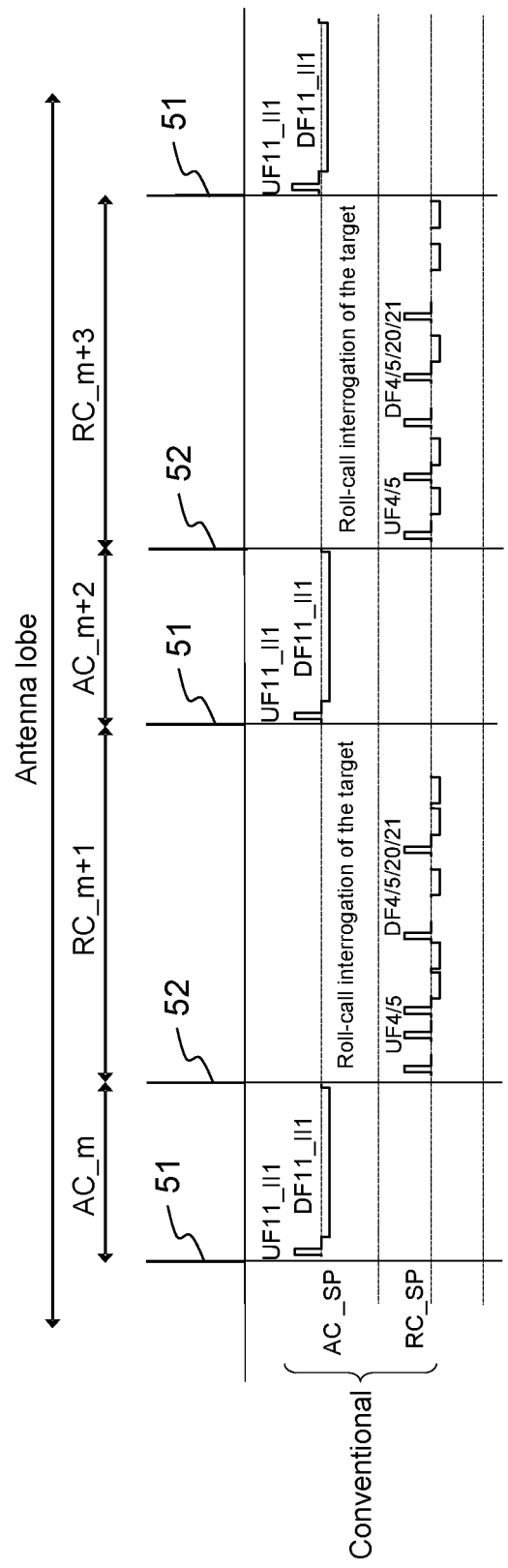
FIG. 5, management of all-call and roll-call transactions according to the prior art.
Figure 6:
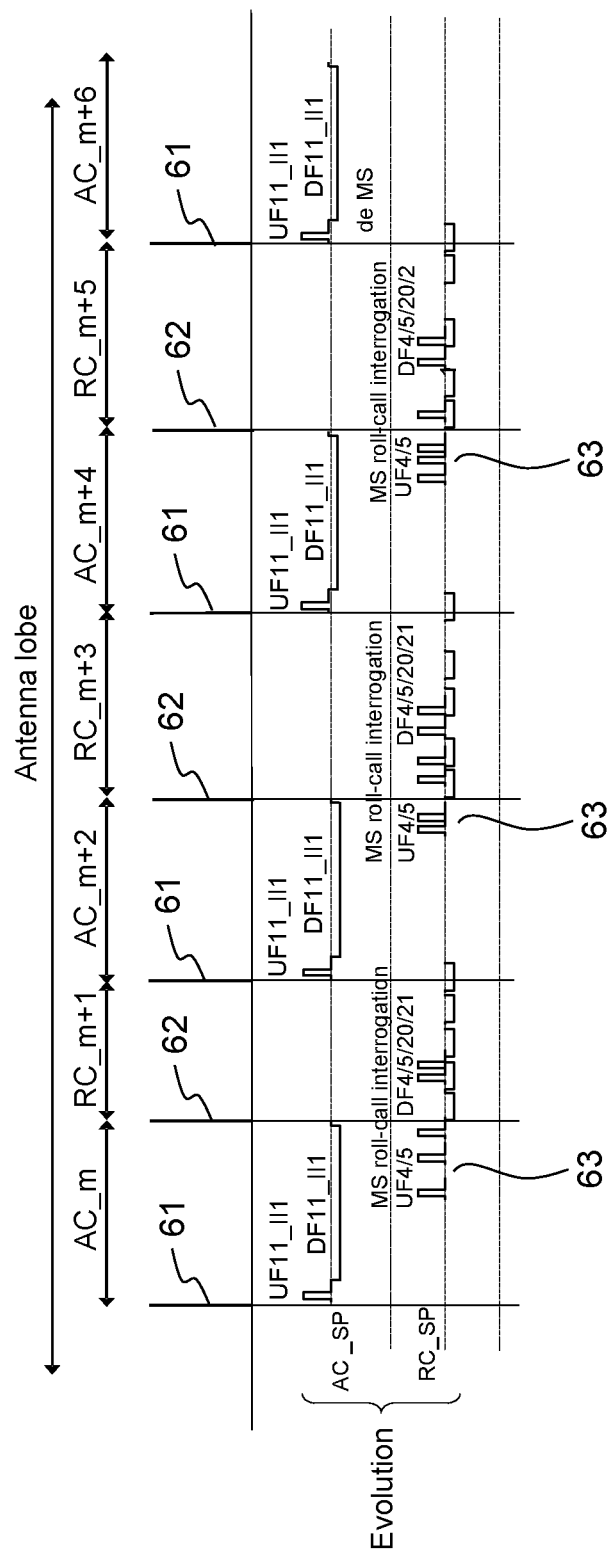
FIG. 6, one example of management of all-call and roll-call transactions in a radar according to the invention.

FIGS. 5 and 6 illustrate the advantages of the invention as regards the sequencing of the roll-call and all-call transactions. More precisely, FIG. 5 shows conventional sequencing as employed with a radar according to the prior art, and FIG. 6 shows sequencing optimized with a radar according to the invention, in relation to the second step 22 described with reference to FIG. 2a.

In FIG. 5, the periods of all-call (AC) transactions and roll-call (RC) transactions follow one after the other in succession at a rate 51, 52. By way of example, FIG. 5 shows four successive periods of order m, m+1, m+2 and m+3 during a dwell time of the antenna lobe of the radar and corresponding successively to AC and RC periods. These AC and RC periods are separate as are the transmission and reception phases that they contain.

The rate 61, 62 of the AC and RC interrogations shown in FIG. 6 and corresponding to a radar according to the invention is different. The RC periods are shorter. In particular, the invention advantageously allows the duration of the sequences of roll-call transactions to be optimized, since it is possible to transmit or not the roll-call transmissions during the roll-call or all-call listening phases. More particularly, the invention allows:

the duration of the RC periods to be decreased, the AC and RC periods to be interleaved (the operations of selectively listening for the RC start in AC periods), and therefore thus the lower limit of the dwell time on a target to be decreased: the antenna lobe now covers seven AC or RC phases (m to m+6).

Figure 7:
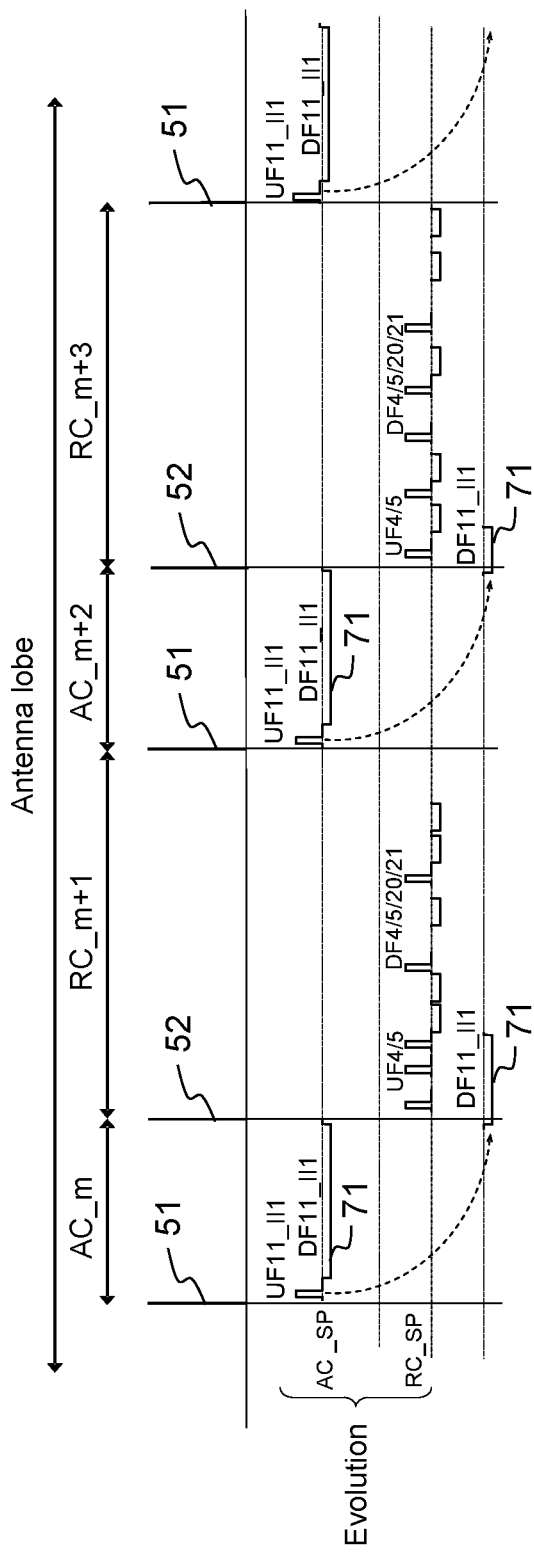
FIG. 7, another example of management of transactions in a radar according to the invention.

FIG. 7 shows another possibility as regards sequencing of the AC and RC periods for a radar according to the invention. The sequencing of the AC and RC periods is for example the same as in the case of FIG. 5. In order to allow aeroplanes to be managed before they enter the operational coverage of the radar, the RC listening operation 71, which starts in the AC period, continues during the start of the RC-transaction phase, which necessarily starts with interrogations (synchronous mode), and therefore no dwell time is lost as regards targets present in the operational coverage.

The objective here is, independently of the optimization of the preceding RC periods (see FIG. 6), to detect targets that are outside the operational range of the radar but within its electromagnetic range, in order to decrease the number of DF11 responses that these targets generate in response to the interrogations of this radar, which consume their response potential needlessly;

which pollute with their responses other radars, in particular those closest the target.

Figure 8A:
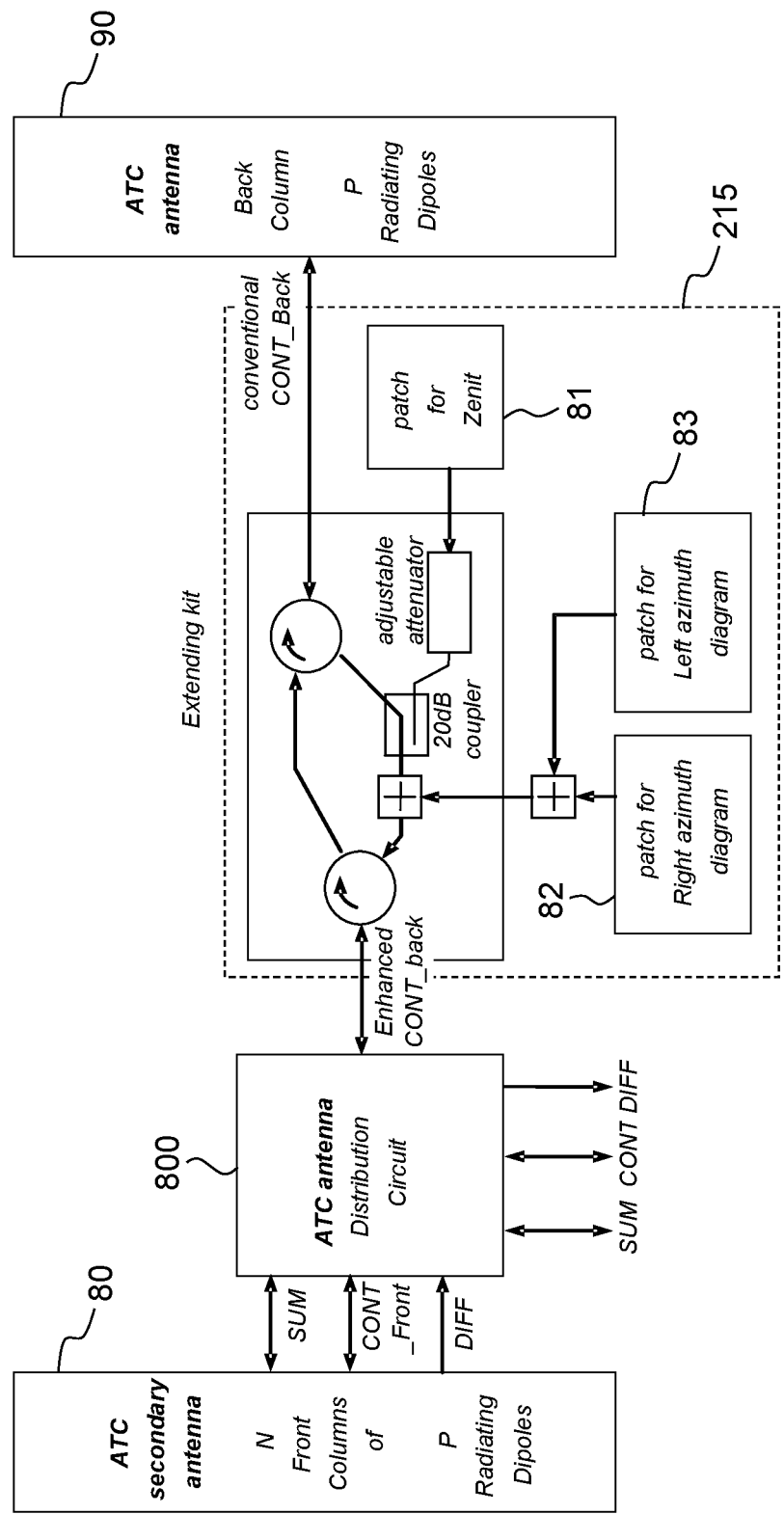
FIG. 8a, the diagram of a kit for extending the CONT_Back pattern of an ATC secondary antenna.

FIG. 8a shows the diagram of a kit 215 for extending the 1090 MHz reception-side CONT_Back pattern (see FIG. 2a) both in azimuth (about −90° and)+90° but also in elevation beyond 50° of elevation in the 3-pattern antenna configuration presented by way of example. This kit 215 is added to the conventional structure of the antenna 1, which is composed:

front-side, of a set 80 of N columns of P radiating dipoles (forming the patterns SUM, DIFF and CONT_Front), back-side, of a column 90 of P radiating dipoles, forming the pattern CONT_Back.

A distribution circuit 800, well known in the art, distributes the signals to the channels SUM, DIFF and CONT (CONT_Front and CONT_Back).

This kit for extending the CONT_Back pattern is intended to fill the detection holes especially illustrated in FIGS. 4a to 4d, as described below.

Figure 8B:
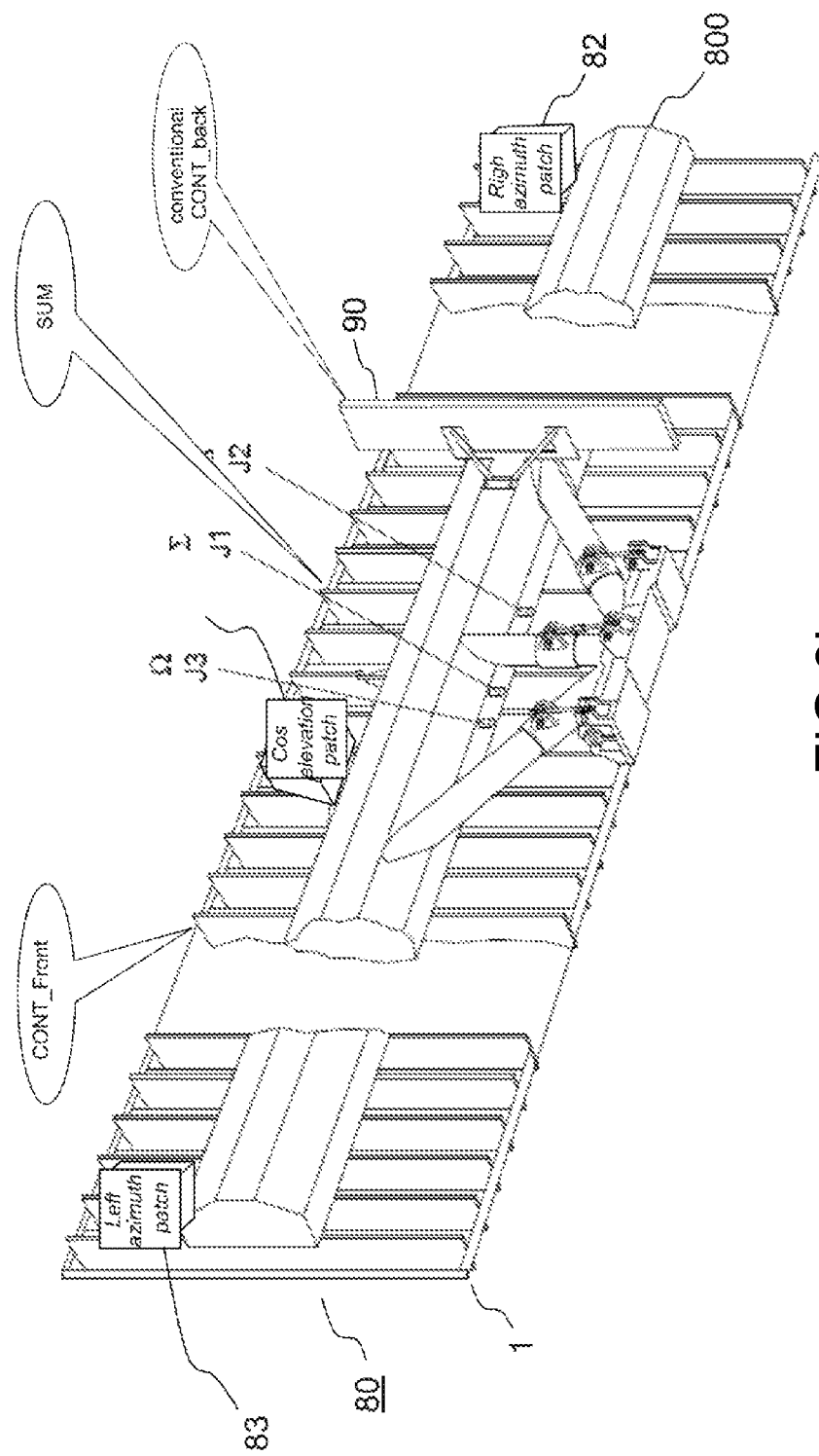
FIG. 8b, the principle of implementation of the kit for extending the CONT_Back pattern on an ATC secondary antenna.

In order not to disrupt the synchronous operation of the radar, the pattern extension 215 is limited to the requirement, i.e. as regards the reception of ADS-B and IFF squitters. The extension is put in place opposite the front panel and therefore extends CONT_Back, as the exemplary embodiment shown in FIG. 8b illustrates. The radiating portion of the extending kit is divided in a plane into 3 directional patches 81, 82, 83 (with a lobe of the order of +/−35° for example):

one 81 to fill the cone of silence with an elevationwise tilt of about 110° in its directional plane and at the azimuth 180°, a second 82 to fill the right detection hole at the azimuth 90°, its directional plane having an elevationwise tilt of about 0°, a third 83 to fill the left detection hole at the azimuth −90°, its directional plane having an elevationwise tilt of about 0°.

The signals are routed, between the distribution circuit and the column 90 (conventional CONT_Back) and the three patches 81, 82, 83, is carried out in a conventional way by a set of circulators, couplers and summers.

FIG. 8b shows one possible arrangement of these radiating element 81, 82, 83 according to the invention on a conventional ATC secondary antenna 1. The "right" patch 82 and "left" patch 83 are each placed at a rear end of the plane of the antenna. The patch 81 assigned to the cone of silence is placed at the centre, behind the plane of the antenna.

The invention claimed is:

1. A secondary radar comprising an antenna having a radiation pattern forming a sum channel, designated SUM, a radiation pattern forming a difference channel, designated DIFF, and a pattern forming a control channel, designated CONT, a first transmission and reception chain being associated with the SUM channel and a second transmission and reception chain being associated with the CONT channel, a reception chain being associated with the DIFF channel, wherein:

each of said transmission and reception chains is able to transmit and to receive simultaneously, the transmission chain comprising a filtering operation that filters signals transmitted at 1090 MHz and the reception chain comprising a filtering operation that filters signals transmitted at 1030 MHz, and said reception chain associated with the DIFF channel comprising a filtering operation that filter signals transmitted at 1030 MHz, in such a way that said chains operate independently of one another, the reception-side signal level remaining unchanged during a synchronous interrogation transmission;

the processing means comprise matching reception-side frequency bands to the characteristics of each of the transaction protocols used;

said reception chains of the SUM, DIFF and CONT channels, respectively, are able to simultaneously listen in synchronous and asynchronous mode for signals received from targets via the SUM, DIFF and CONT patterns, respectively, said operations of listening in synchronous and asynchronous mode being independent of each other, the reception-side signal level remaining unchanged during a synchronous interrogation transmission.

2. The secondary radar according to claim 1, wherein said CONT pattern being composed of a front radiation pattern forming a channel designated CONT_Front and a back radiation pattern forming a channel designated CONT_Back, said CONT_Front and CONT_Back patterns are processed separately in such a way that each of said transmission and reception chains is applied to the CONT_Front channel and to the CONT_Back channel.

3. The secondary radar according to claim 2, comprising a kit for extending the radiation pattern of the CONT_Back channel, which is placed on the back side of said antenna, said kit comprising three radiating patches:

a first patch for filling the elevationwise detection hole called the cone of silence;
   a second patch for filling the detection hole at the azimuth 90°,
   a third patch for filling the detection hole at the azimuth −90°.

4. The secondary radar according to claim 1, wherein each of said transmission chains comprises filtering operations dedicated to rejecting parasitic signals transmitted at 1090 MHz.

5. The secondary radar according to claim 1, wherein each of said reception chains comprises filtering operations dedicated to rejecting parasitic signals at 1030 MHz originating from the transmission channel.

6. The secondary radar according to claim 1, wherein having as mission ATC surveillance, said radar performs simultaneous listening operations via said patterns separately for ADS-B squitters and independently of synchronous transactions.

7. The secondary radar according to claim 1, wherein having as mission IFF identification, said radar performs synchronous IFF detections, independently of synchronous SSR and Mode S transactions.

8. The secondary radar according to claim 1, wherein having as mission IFF identification, said radar performs simultaneous listening operations via said patterns separately for Mode 5 Level 2 squitters, independently of synchronous transactions.

9. The secondary radar according to claim 1, wherein having as mission control of the aerial environment, said radar performs simultaneous listening operations via said patterns separately for any type of secondary responses, independently of synchronous transactions.

10. The secondary radar according to claim 1, wherein said radar successively transmitting in all-call interrogation periods and roll-call interrogation periods, the roll-call interrogations start in the all-call interrogation periods.

11. The secondary radar according to claim 1, wherein said radar successively transmitting in all-call interrogation periods and roll-call interrogation periods, all-call listening operations started in all-call periods continue into roll-call periods.

* * * * *